(12) United States Patent
Schneider et al.

(10) Patent No.: US 10,777,784 B2
(45) Date of Patent: Sep. 15, 2020

(54) DEEP FORMAT POUCH FOR BATTERY CELL

(71) Applicant: Robert Bosch GmbH, Stuttgart (DE)

(72) Inventors: Dan Schneider, Orion, MI (US); Mehul Botadra, Sterling Heights, MI (US); Robert Schoenherr, Oxford, MI (US)

(73) Assignees: Robert Bosch Battery Systems LLC, Orion, MI (US); Robert Bosch GmbH, Stuttgart (DE)

( * ) Notice: Subject to any disclaimer, the term of this patent is extended or adjusted under 35 U.S.C. 154(b) by 90 days.

(21) Appl. No.: 15/768,010

(22) PCT Filed: Sep. 28, 2016

(86) PCT No.: PCT/EP2016/073063
§ 371 (c)(1),
(2) Date: Apr. 13, 2018

(87) PCT Pub. No.: WO2017/063879
PCT Pub. Date: Apr. 20, 2017

(65) Prior Publication Data
US 2018/0301669 A1   Oct. 18, 2018

Related U.S. Application Data

(60) Provisional application No. 62/242,367, filed on Oct. 16, 2015.

(51) Int. Cl.
*H01M 2/00* (2006.01)
*H01M 2/02* (2006.01)
*H01M 2/04* (2006.01)

(52) U.S. Cl.
CPC ....... *H01M 2/0287* (2013.01); *H01M 2/0217* (2013.01); *H01M 2/0408* (2013.01);
(Continued)

(58) Field of Classification Search
CPC ............ H01M 2/0217; H01M 2/0287; H01M 2002/0297; H01M 2/0426; H01M 2/0473
See application file for complete search history.

(56) References Cited

U.S. PATENT DOCUMENTS 6,451,474 B1   9/2002   Kozu et al.
6,573,001 B1   6/2003   Shinohara et al.
(Continued)

FOREIGN PATENT DOCUMENTS

EP   1353389   9/2005
EP   1641058   3/2006
(Continued)

OTHER PUBLICATIONS

PCT International Search Report for PCT/EP2016/073063.

*Primary Examiner* — Cynthia H Kelly
*Assistant Examiner* — Monique M Wills
(74) *Attorney, Agent, or Firm* — Kelly McGlashen; Maginot, Moore & Beck LLP

(57) ABSTRACT

A pouch cell includes a generally rectangular cell housing formed of a metal laminated film that includes a box portion and a lid portion that is formed separately from the box portion. The active material including the electrode and an electrolyte is placed into the box portion and the lid portion is welded to the box portion. The box portion and the lid portion are formed and assembled together without using a drawing or a punching process. Instead, the pouch cell housing is formed via a series of folding and welding steps, whereby the pouch cell size is not limited by the draw depth of the metal laminated film.

8 Claims, 7 Drawing Sheets

(52) U.S. Cl.
CPC ....... *H01M 2/0426* (2013.01); *H01M 2/0473* (2013.01); *H01M 2002/0297* (2013.01)

(56) References Cited

U.S. PATENT DOCUMENTS

| | | | |
|---|---|---|---|
| 7,687,190 B2 | 3/2010 | Jang et al. | |
| 2002/0164441 A1 | 11/2002 | Amine et al. | |
| 2005/0084749 A1* | 4/2005 | Hwang | H01M 2/0202 |
| | | | 429/127 |
| 2006/0083981 A1 | 4/2006 | Mori et al. | |
| 2012/0321935 A1* | 12/2012 | Kim | H01M 2/02 |
| | | | 429/151 |
| 2013/0071696 A1* | 3/2013 | Kim | H01M 2/0275 |
| | | | 429/7 |
| 2013/0337304 A1* | 12/2013 | Luski | H01M 2/021 |
| | | | 429/94 |
| 2014/0205882 A1* | 7/2014 | Kepler | H01M 10/647 |
| | | | 429/120 |
| 2014/0308555 A1* | 10/2014 | Hattori | H01M 10/0431 |
| | | | 429/94 |
| 2015/0179993 A1 | 6/2015 | Deponte et al. | |
| 2015/0364729 A1* | 12/2015 | Jang | H01M 2/0275 |
| | | | 429/185 |
| 2015/0372337 A1* | 12/2015 | Kim | H01M 2/0212 |
| | | | 429/94 |

FOREIGN PATENT DOCUMENTS

| | | |
|---|---|---|
| FR | 2460731 | 1/1981 |
| JP | H8-175574 | 6/1996 |
| JP | 2000195474 | 7/2000 |
| JP | 2000200585 | 7/2000 |
| JP | 2002-367574 | 12/2002 |
| JP | 2011-86623 | 4/2011 |
| JP | 2014-139945 | 7/2014 |
| JP | 2015-116706 | 6/2015 |
| KR | 10-0383814 | 5/2003 |
| KR | 10-1155918 | 6/2012 |
| KR | 1020150069720 | 6/2015 |
| WO | 200239516 | 5/2002 |
| WO | 2012091196 | 7/2012 |

* cited by examiner

PRIOR ART

DEEP FORMAT POUCH FOR BATTERY CELL

This application is a 35 U.S.C. § 371 National Stage Application of PCT/EP2016/073063, filed on Sep. 28, 2016, which claims the benefit of U.S. Provisional Patent Application No. 62/242,367, filed on Oct. 16, 2015, the disclosures of which are incorporated by reference herein in their entirety.

BACKGROUND

1. Field of the Invention

The present invention relates a pouch-type battery cell housing formed of a laminate material in which at least one layer of the laminate material is a metal foil layer, and in which the pouch has a depth that is greater than 20 mm.

2. Description of the Related Art

Battery packs provide power for various technologies ranging from portable electronics to renewable power systems and environmentally friendly vehicles. For example, hybrid electric vehicles (HEV) use a battery pack and an electric motor in conjunction with a combustion engine to increase fuel efficiency. Battery packs are formed of a plurality of battery modules, where each battery module includes several electrochemical cells. The cells are arranged in stacks and are electrically connected in series or in parallel. Likewise, the battery modules within a battery pack are electrically connected in series or in parallel.

Different cell types have emerged in order to deal with the space requirements of a very wide variety of installation situations, and the most common types used in automobiles are cylindrical cells, prismatic cells, and pouch cells. These cells exhibit substantially the same internal construction, with an anode, a cathode, a separator membrane that separates the cathode space from the anode space, an electrolyte/solvent, and lithium source, but they can differ appreciably in terms of their general dimensions, cell housing, and volumetric energy efficiency.

With respect to the cell housing, for example, the cylindrical cells and prismatic cells each have a rigid housing, usually made of metal or plastic, whereas the pouch cell is surrounded only by a flexible outer envelope made of a laminated film material which seals off the actual battery space from the environment. This difference in the construction of the cell housing has a large influence on the power-to-weight ratio of the battery cells and can be very important in the manufacture of battery modules and battery packs that are made up of multiple interconnected cells.

SUMMARY

A pouch cell housing is formed of a flexible outer envelope made of a metal laminated film, and is used to house an electrode assembly and electrolyte to form a pouch cell. The pouch cell housing is formed without using a drawing process. Instead, the pouch cell housing is formed via a series of folding and welding steps, whereby the pouch cell can be manufactured in any desired depth. In some aspects, a first rectangular blank of the metal laminated film is folded and welded to form a generally box-shaped structure (e.g., a hollow, rectangular container having an open end). A second rectangular blank is similarly folded and welded to create a lid for the box. The active material including the electrode and an electrolyte is placed into the box and the lid is welded to the box. The size of the box shaped structure is determined by the size of the first blank.

The pouch cell housing is advantageous compared to some conventionally formed pouch cells since it can be made in any desired size, and is particularly suited for providing pouch cells having a depth that is greater than 20 mm. This can be compared to some pouch conventional pouch cells that are formed by a drawing process. In particular, the maximum draw depth of the metal laminated film used to form the pouch cell is limited by the material properties of the metal layer of the laminated film material. For example, in some conventional pouch cells formed of an aluminium laminated film, two (2) identical laminated film sheets are drawn to a depth of approximately 6 mm. The active material and separator that form the electrode are sandwiched between the laminated film sheets and the sheets are welded around the circumference with a heating element to form a conventional (drawn) pouch cell (FIG. 12). This conventional method limits the thickness of the pouch cell via the drawing process since the aluminum layer does not have the required elongation properties to allow a deeper draw. For example, for some aluminum laminated film materials having a maximum draw depth of about 10 mm, the forming process including the drawing step thus limits the height of the pouch cell that can be formed to about 10 mm to 20 mm, where a cell height h of 20 mm is obtained by sandwiching the active material between two drawn films, where the cell height h corresponds to the draw direction of the material used to form the pouch. This height limit in turn limits the amount of active material that can be stored within the pouch cell. Such conventional pouch cells having drawn cell housings are typically formed with plates having a large area (e.g., length and width dimensions) to achieve acceptable energy outputs. That is, the aspect ratio of cell height to length or width is very small (for example, less than 0.1).

A "deep" pouch cell that can be formed having a relatively large aspect ratio of cell height to cell length or width, for example greater than 0.1. In some aspects, the deep pouch cell may have a height (e.g., a dimension parallel to a stacking direction of plates of the electrode) that is greater than 20 mm. Advantageously, due to the relatively greater height, the deep pouch cell can hold an increased number of electrode plates and thus can provide increased energy output compared to some conventional pouch cells formed by drawing and having electrode plates of the same area. Alternatively, such a deep pouch cell can be formed having a smaller area and a greater number of electrode plates.

In addition, a draw-free method of assembling a first blank and a second blank via folding and welding to form a closed and sealed pouch cell housing is described. Since the method is free of drawing steps, the pouch cell housing can be formed having a depth of greater than about 20 mm.

DETAILED DESCRIPTION

Figure 1:
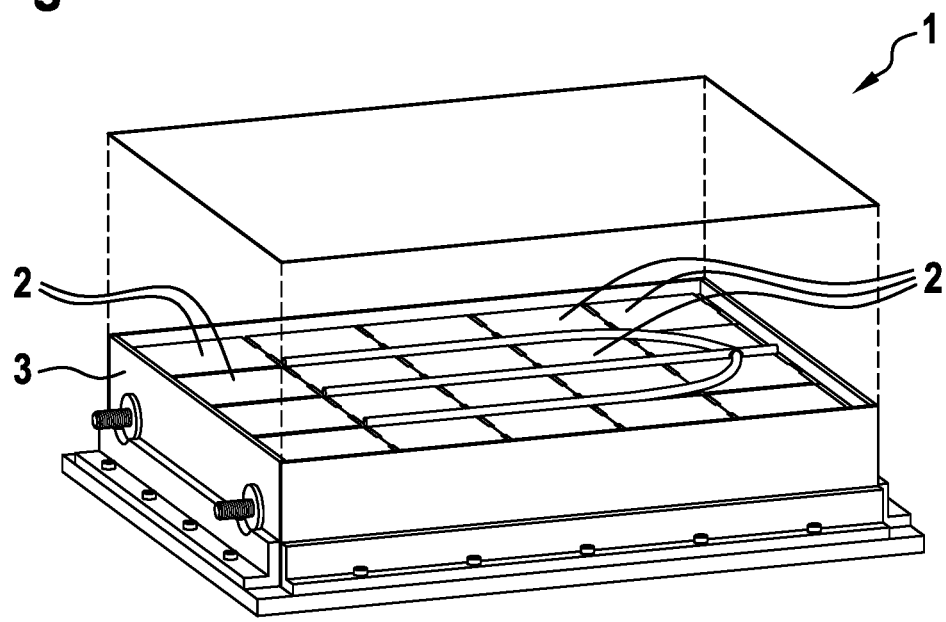
FIG. 1 an exploded perspective view of a battery pack including an array of pouch cells.
Figure 2A:
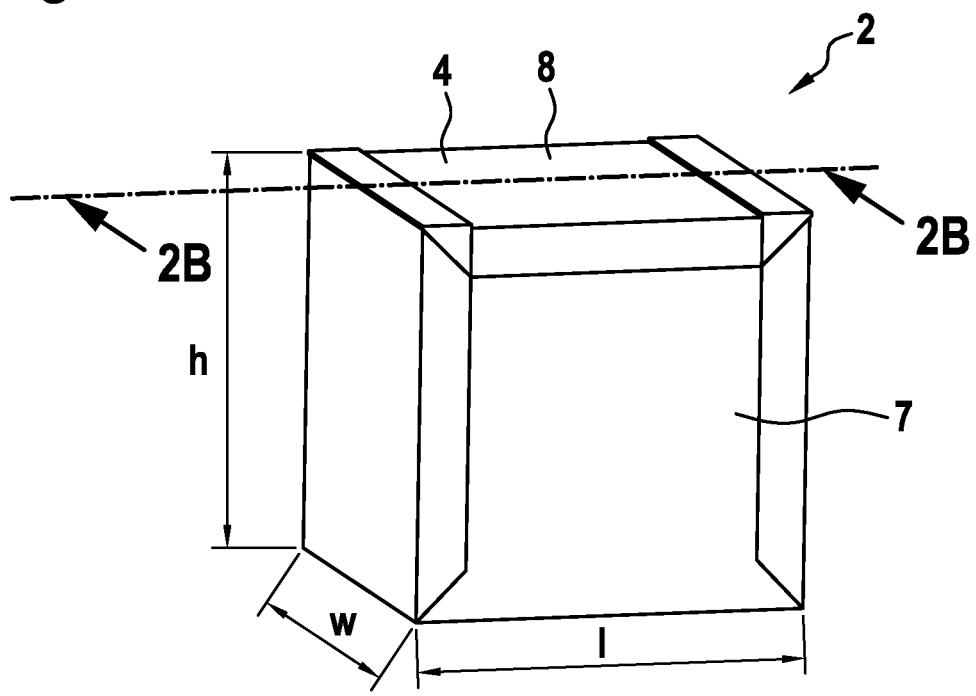
FIG. 2A is a perspective view of a pouch cell.
Figure 2B:
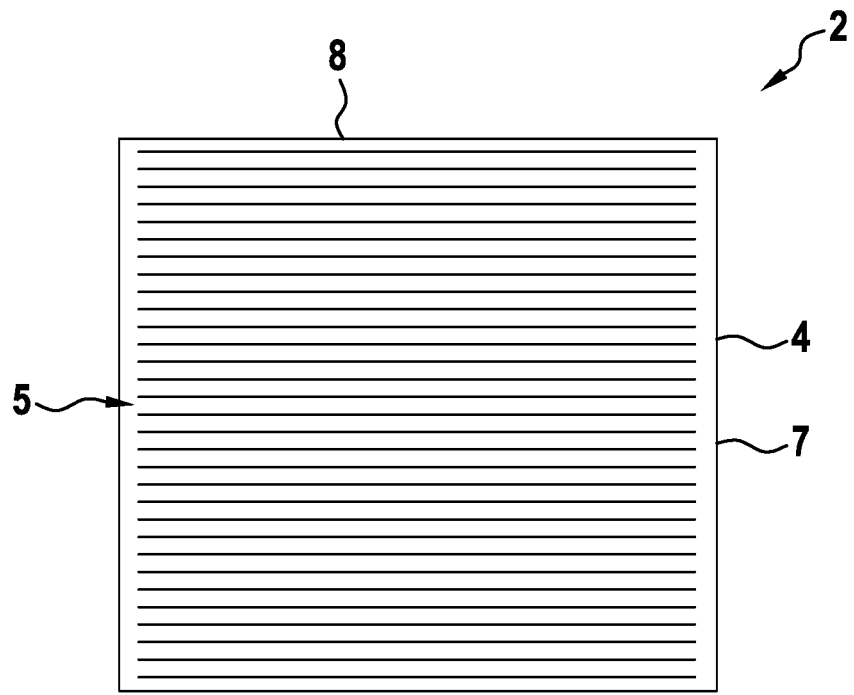
FIG. 2B is a schematic cross sectional view of the pouch cell of FIG. 2A as seen across line 2B-2B.
Figure 3:
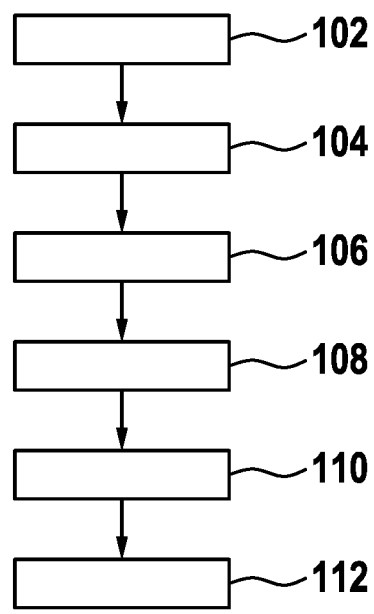
FIG. 3 is a flow chart of steps for forming the pouch cell of FIG. 2.

Referring to FIGS. 1, 2A and 2B, a battery pack 1 used to provide electrical power includes electrochemical cells 2 that are electrically interconnected and stored in an organized manner within a battery pack housing 3. The cells 2 are lithium-ion pouch cells that include an electrode assembly 5 that is sealed within a cell housing 4 along with an electrolyte to form a power generation and storage unit. The electrode assembly 5 may be, but is not limited to, a "stacked" electrode assembly that includes a series of stacked positive electrode plates alternating with negative electrode plates and separated by intermediate separator plates. In some embodiments, an array of cells 2 may be bundled together to form battery modules (not shown), which in turn are stored within the battery pack housing 3. Within the battery module and/or within the battery pack housing 3, the array of cells 2 are electrically connected in series or in parallel.

The cell housing, or pouch, 4 has a rectangular shape, and includes a box portion 7 and a lid portion 8 that is formed separately from, and then joined to, the box portion 7. The box portion 7 and the lid portion 8 are formed and assembled together without using a drawing or a punching process. Although the cell housing 4 may be formed having any proportions, in some embodiments the resulting pouch cell housing 4 is a "deep" pouch cell housing having a relatively large aspect ratio of cell height h (for example, a dimension parallel to a stacking direction of plates of the electrode) to cell length l or width w, for example greater than 0.1. In some embodiments, the deep pouch cell housing 4 may have a height h that is greater than a draw depth of the material used to form cell housing 4, for example, greater than 20 mm for a cell housing formed of an aluminium laminated film.

Referring to FIGS. 3-11, a method of forming a battery cell 2 having a pouch cell housing 4 will now be described. The pouch cell housing 4 is formed of a metal laminated film that is arranged into the pouch configuration using a non-drawing or non-punching method. In particular, the method used to form the cell housing 4 instead uses folding and welding techniques to provide a pouch cell housing that can have a deep profile.

Figure 4:
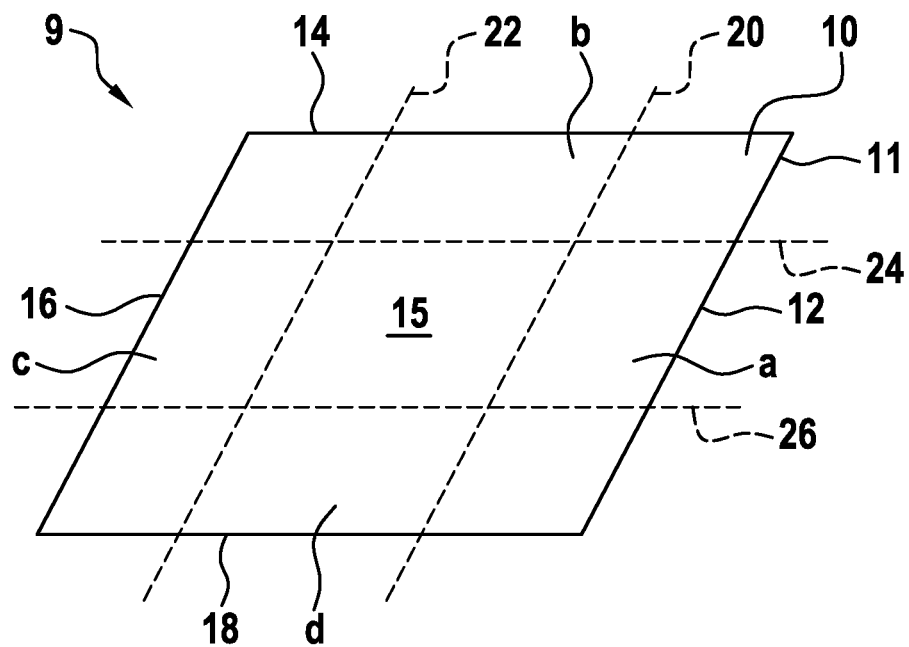
FIG. 4 is a perspective view of a blank used to form the pouch cell of FIG. 2 showing fold lines in light dashed lines.

The method of forming a battery cell 2 includes forming a pouch cell housing 4. The pouch cell housing 4 is formed by assembling together a first blank 9 formed into the box portion 7 and a second blank 109 formed into the lid portion 8 via a series of folding and welding steps. In particular, the box portion 7 is formed as follows:

Referring to FIG. 4, a first blank 9 of a metal laminated foil is provided (step 102). The first blank 9 has a first blank surface 10 and a second blank surface 11 that is opposed to the first blank surface 10. For example, the foil may be a three-layer aluminum laminated foil that includes a layer of aluminum foil sandwiched between a layer of polyamide and a layer of polypropylene. In this example, the surface of the foil corresponding to the polypropylene corresponds to the first blank surface 10, and the surface of the foil corresponding to the polyamide corresponds to the second blank surface 11, and the first blank 9 is arranged so that after folding, the second blank surface 11 (e.g., the polyamide layer) provides the outer surface of the box portion 7.

The first blank 9 has a rectangular peripheral shape, for example a square peripheral shape, and thus has a first edge 12, a second edge 14 adjoining the first edge 12, a third edge 16 adjoining the second edge 14 and parallel to the first edge 12, and a fourth edge 18 adjoining the third edge 16 and parallel to the second edge 14.

Figure 5:
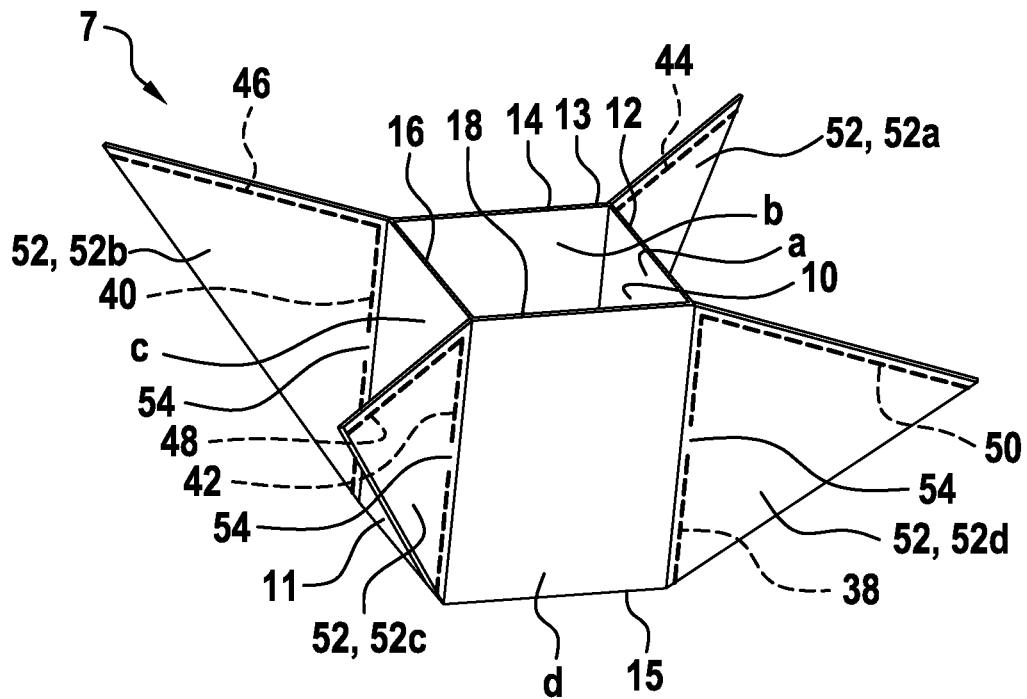
FIG. 5 is a perspective view of a box portion of the pouch cell showing weld lines in heavy dashed lines.

Referring to FIG. 5, the first blank 9 is folded and welded to form the box portion 7 having an a side, a b side, a c side and a d side, an open end 13, and a closed end 15 opposed to the open end 13 (step 104). The folds are made such that the first blank surface 10 corresponds to the inner surface of the box portion 7. More specifically, to achieve the open box-shaped configuration, the first blank 9 is formed as follows:

The first edge 12 is folded about a first fold line 20 so that the first edge 12 overlies the first blank surface 10, and the third edge 16 is folded about a second fold line 22 so that the third edge overlies the first blank surface 10.

In addition, the second edge 14 is folded about a third fold line 24 so that the second edge 14 overlies the first blank surface 10, and the fourth edge 18 is folded about a fourth fold line 26 so that the fourth edge overlies the first blank surface 10. The region of the first blank 9 defined between the fold lines 20, 22, 24, 26 corresponds to a closed end 15 of the box portion 7.

Following the folding steps, the first blank 9 is welded along intersecting portions of the fold lines 20, 22, 24, 26 to form sides of the box portion 7. In particular, a first weld line 36 (not shown) is formed along an intersection between the first fold line 20 and the third fold line 24 and a second weld line 38 is formed along an intersection between the first fold line 20 and the fourth fold line 26, whereby an "a" side of the box portion 7 is defined between the first and second weld lines 36, 38, the first edge 12 and the first fold line 20. A third weld line 40 is formed along an intersection between the second fold line 22 and the third fold line 24, and a fourth weld line 42 is formed along an intersection between the second fold line 22 and the fourth fold line 26, whereby a "c" side of the box portion 7 is defined between the third and fourth weld lines 40, 42, the third edge 16 and the second fold line 22. In addition, a "b" side of the box portion is defined between the first and third weld lines 36, 40, the second edge 14 and the third fold line 24, and a "d" side of the box portion 7 is defined between the second and fourth weld lines 38, 42, the fourth edge 18 and the fourth fold line 26. The first, second, third and fourth weld lines 36, 38, 40, 42 extend between the respective fold lines 20, 22, 24, 26 and the corresponding peripheral edge 12, 14, 16, 18, In addition to forming the a, b, c, and d sides of the box portion 7, the first through fourth weld lines 36, 38, 40, 42 also form triangular regions of overlapping film, referred to herein as "pleats" 52, at each side corner of the box portion 7.

Each pleat 52 is welded to join intersecting portions of the edges 12, 14, 16, 18 of the first blank 9. For example, in a first pleat 52a, a fifth weld line 44 is formed along overlapping portions of the first edge 12 and the second edge 14. In a second pleat 52b, a sixth weld line 46 is formed along overlapping portions of the second edge 14 and the third edge 16. In a third pleat 52c, a seventh weld line 48 is formed along overlapping portions of the third edge 16 and the fourth edge 18. In a fourth pleat 52d, an eighth weld line 50 is formed along overlapping portions of the fourth edge 18 and the first edge 12. The fifth, sixth, seventh and eighth weld lines 44, 46, 48, 50 are continuous between the side corner and an apex of the respective pleat 52. However, the first, second, third and fourth weld lines 36, 38, 40, 42 that form the side corners are discontinuous so that a small port 54 exists between the interior space of the box portion 7 and each pleat 52. The port 54 is used for gas relief during formation of the cell 2, permitting formation gasses to vent into the pleats 52. In a subsequent step, the ports 54 are sealed and the gas-filled pleats 52 trimmed from the box portion 7, as discussed further below.

Figure 6:
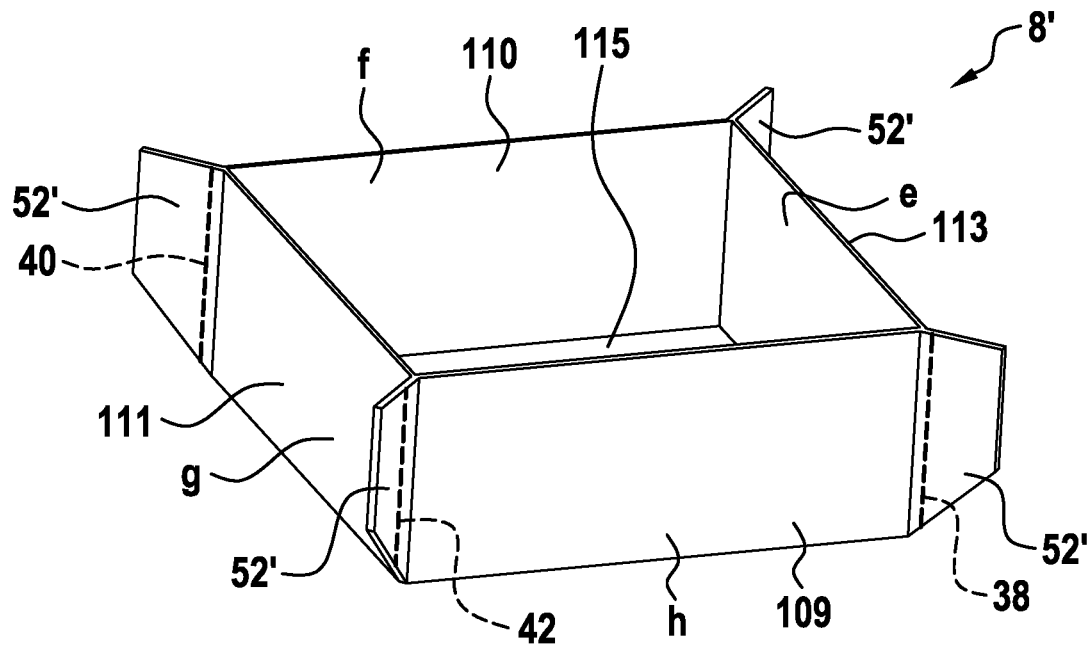
FIG. 6 is a perspective view of a lid portion of the pouch cell showing weld lines in heavy dashed lines.
Figure 7:
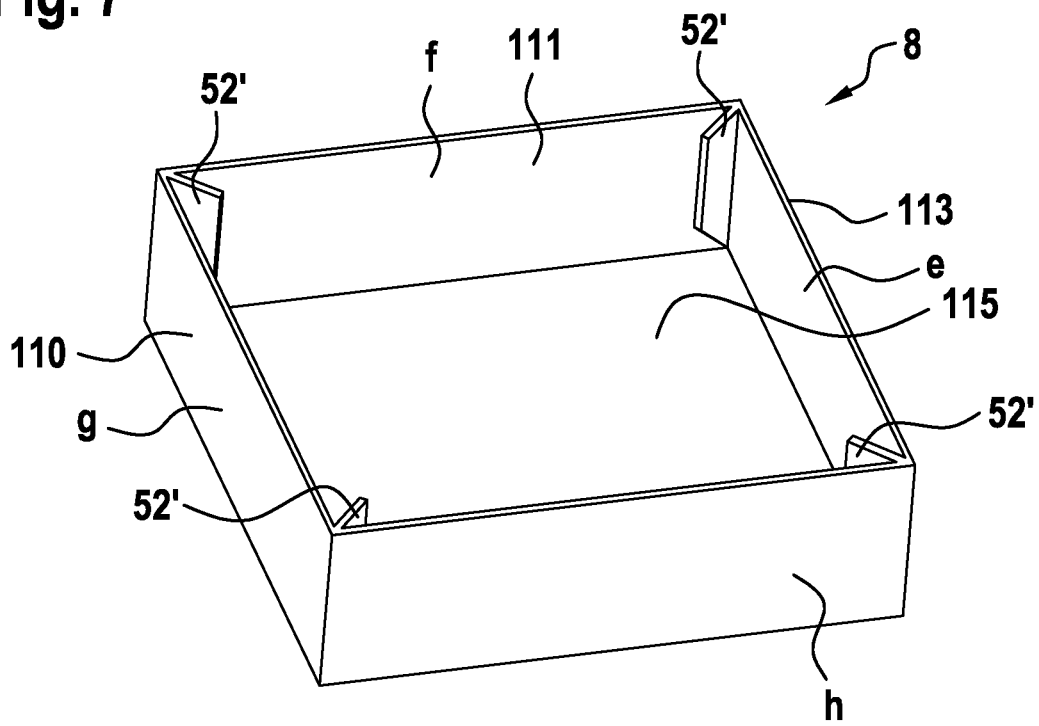
FIG. 7 is a perspective view of the inverted lid portion.

Referring to FIGS. 6 and 7, like the box portion 7, the lid portion 8 has the shape of an open-ended box. The lid portion 8 is formed using the following steps.

A second blank 109 of the metal laminated foil is provided (step 106). The second blank 109 has a first blank surface 110 and a second blank surface 111 that is opposed to the first blank surface 110. In this example, the surface of the foil corresponding to the polypropylene corresponds to the first blank surface 110, and the surface of the foil corresponding to the polyamide corresponds to the second blank surface 111, and the second blank 109 is arranged so that after folding into an open-ended box 8', the second blank surface 111 (e.g., the polyamide layer) provides the outer surface.

The second blank 109 has the same peripheral shape as the first blank 9. In the illustrated embodiment, the second blank 109 has a square peripheral shape. The lid portion 8 has a closed end 115 dimensioned to fit within and close the open end 13 of the box portion 7. However, the sides e, f, g, and h of the lid portion 8 are shorter than the corresponding sides a, b, c, d of the box portion 7. For this reason, the second blank 109 has a smaller area than that of the first blank 9.

The second blank 109 is folded and welded according to step 104 to form an open ended box 8' having an open end 113, an opposed closed end 115, and sides e, f, g and h (step 108). The fold lines of the second blank 109 are arranged such that the closed end 115 of the lid portion 8 has the same shape and dimensions as the closed end 15 of the box portion 7. In addition, the folds are made such that the first blank surface 110 (e.g., the polypropylene layer) corresponds to the inner surface of the open ended box 8', and pleats 52' extend outward from each side corner of the open ended box 8'.

Optionally, the pleats 52' of the open ended box 8' may be trimmed along the first, second, third and fourth weld lines to remove the respective apexes of the pleats 52'.

The open-ended box 8' is inverted (e.g., turned inside out) to form the lid portion 8 such that the first blank surface 110 (e.g., the polypropylene layer) corresponds to an outer surface of the lid portion 8, the second blank surface 111 (e.g., the polyamide layer) corresponds to an inner surface of the lid portion 8, and the pleats 52' protrude inward from the side corners.

Figure 8:
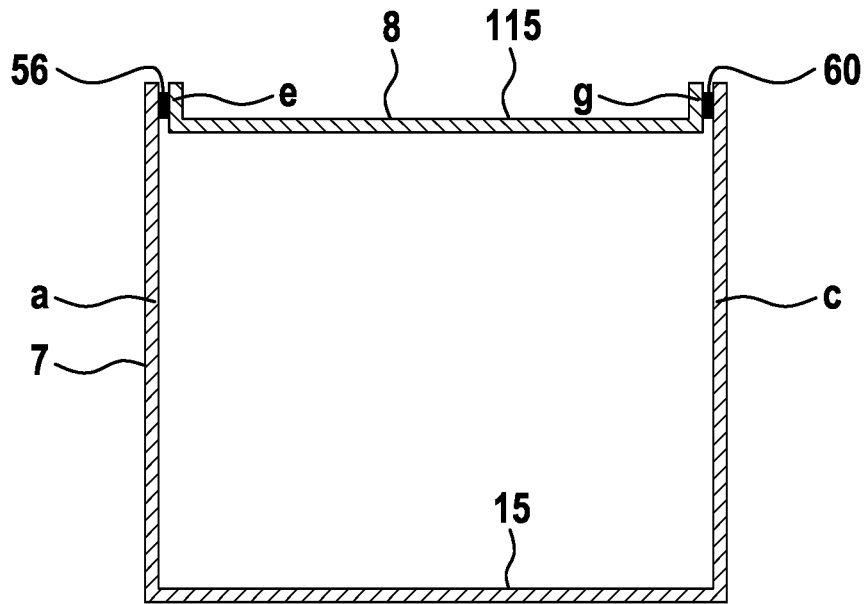
FIG. 8 is a cross sectional view of the pouch cell during assembly of the lid portion with the box portion as seen in the direction of arrow A of FIG. 8.

Referring to FIGS. 8-11, the lid portion 8 is assembled with the box portion 7 so as to close the open end of the box portion 7 as follows (step 110):

The lid portion 8 is inserted into the open end 13 of the box portion 7 such that the closed end 115 of the lid portion 8 is surrounded by the a side, the b side, the c side and the d side of the box portion 7, and such that the closed end 115 of the lid portion 8 is spaced apart from the open end 13 of the box portion 7 (FIG. 8). In addition, the open end 113 of the lid portion 8 opens in the same direction as the open end 13 of the box portion 7, and the e side, the f side, the g side and the h side of the lid portion 8 are at least partially surrounded by the a side, the b side, the c side and the d side of the box portion 7.

Figure 9:
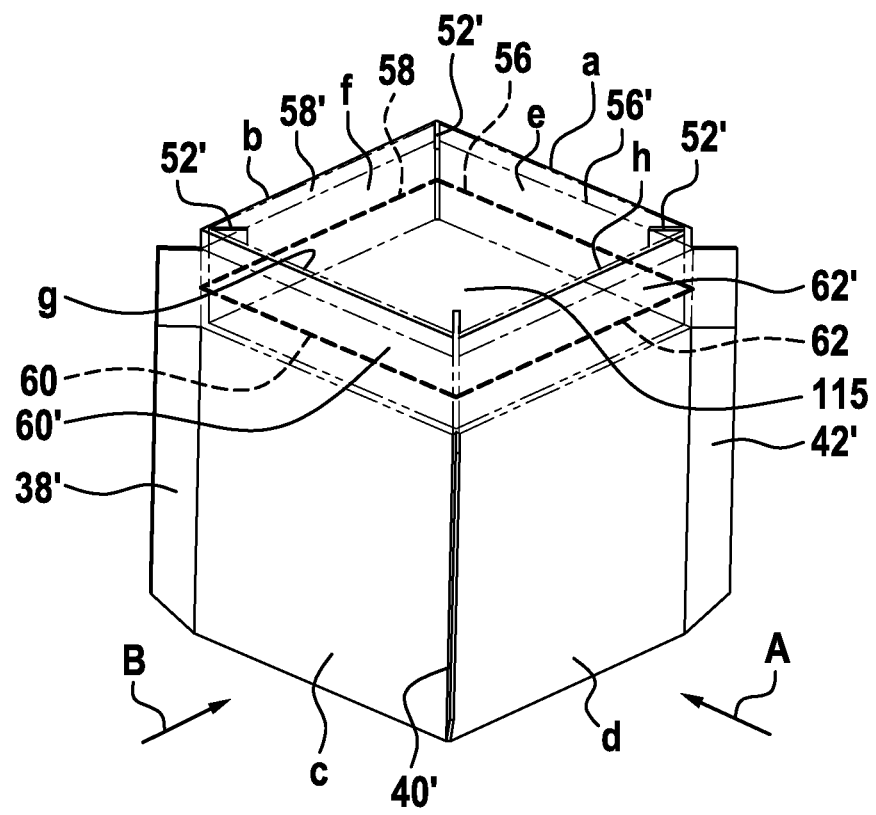
FIG. 9 is a perspective view the pouch cell during assembly of the lid portion with the box portion.

Following insertion, each side a, b, c, d of the box portion 7 is welded to the corresponding overlapping side e, f, g or h of the lid portion 8 (step 112). In the illustrated example, the welding step includes welding the a side to the e side along a $9^{th}$ weld line 56, welding the b side to the f side along a $10^{th}$ weld line 58, welding the c side to the g side along an $11^{th}$ weld line 60, and welding the d side to the h side along a $12^{th}$ weld line 62 (FIG. 8). The $9^{th}$ through $12^{th}$ weld lines 56, 58, 60, 62 extend along the entire length of each corresponding side to form a continuous weld line along a circumference of the box portion 7, whereby the lid portion 8 is sealed to the box portion 7, forming a sealed pouch cell housing 4 (FIG. 9). In addition, the portions of the sides a-h of the box and lid portions 7, 8 corresponding to the weld lines form outwardly protruding end tabs 56',58', 60',62' that surround the lid portion closed end 115.

Prior to assembling the lid portion 8 with the box portion 7, the electrode assembly 5 and an electrolyte are placed inside the box portion 7. In addition, following the step of welding the lid portion 8 to the box portion 7, formation of the cell 2 is performed. Gas released during formation of the cell 2 is released into the pleats 52 of the box portion via the ports 54. Although the pleats 52 expand, the gas is trapped within the pleats. When formation is complete, the pleats 52 are filled with gas. In some embodiments, the pleats 52 are punctured and the gas is removed from the interior of the pleat via vacuum. In addition, the first through fourth weld lines 36, 38, 40, 42 are made continuous and the pleats 52 are trimmed off the box portion 7, leaving protruding side tabs 36',38', 40',42' corresponding to the weld lines 36, 38, 40, 42.

In some embodiments, the positive and negative terminals (not shown) of the electrode assembly 5 pass between the facing surfaces of the overlapping sides, for example between side a of the box portion 7 and side e of the lid portion 8 (not shown). A sealant may be used to surround the terminals in this region to ensure that the pouch cell housing 4 resulting from the assembly of the lid portion 8 and the box portion 7 is completely sealed.

Figure 10:
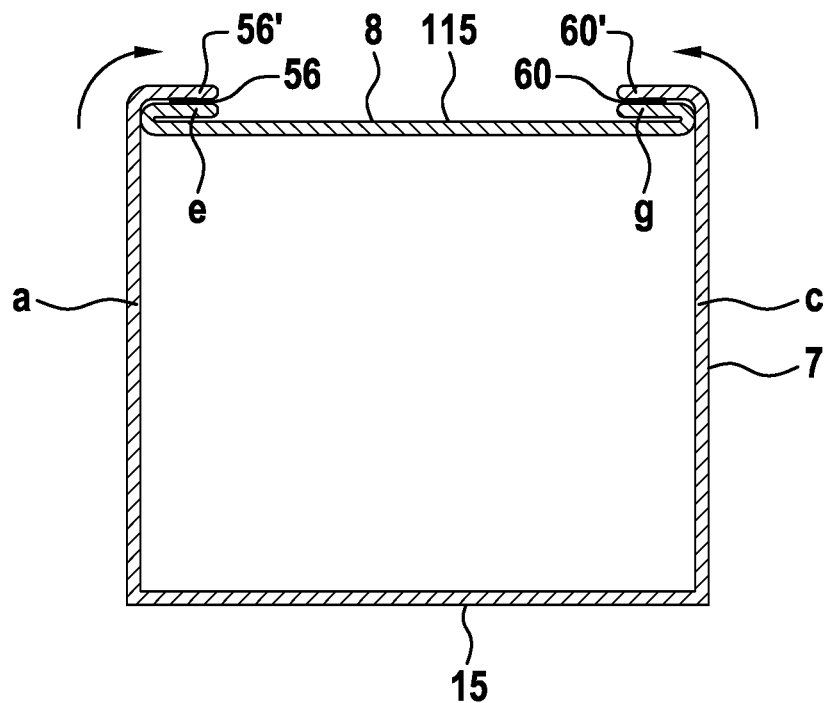
FIG. 10 is a cross sectional view of the pouch cell during assembly of the lid portion with the box portion as seen in the direction of arrow A of FIG. 8.
Figure 11:
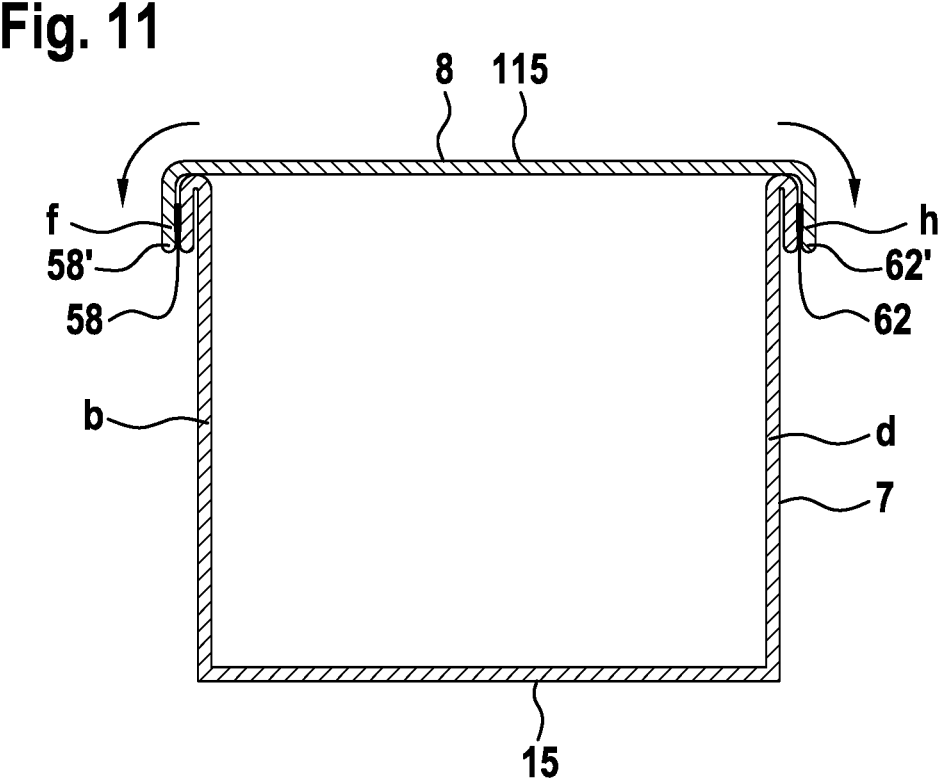
FIG. 11 is a cross sectional view of the pouch cell during assembly of the lid portion with the box portion as seen in the direction of arrow B of FIG. 8.
Figure 12:
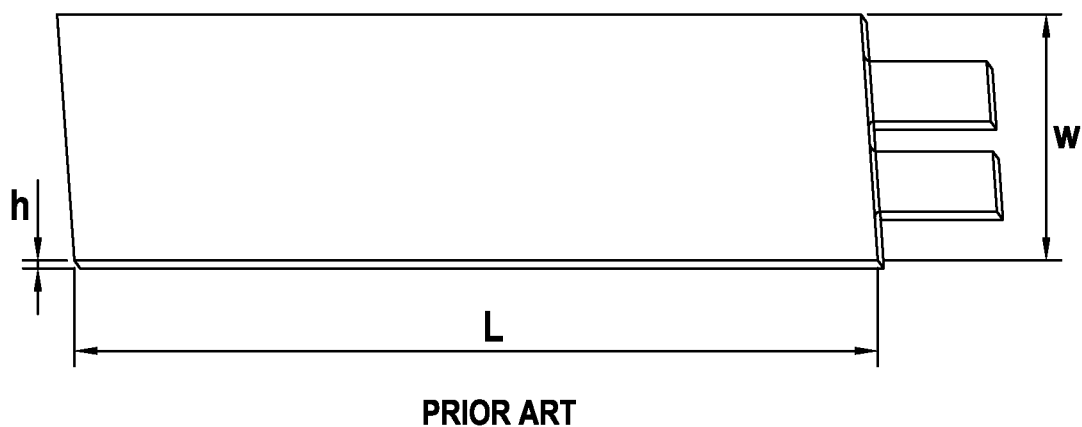
FIG. 12 is a perspective view of a conventional pouch cell formed by drawing the metal laminate film.

Once the lid portion 8 has been sealed to the box portion 7, the end tabs 56',58', 60',62' that surround the lid portion closed end 115 are folded against the pouch cell housing 4 in order to minimize the pouch cell profile. In particular, the end tab 56' corresponding to the welded portions of the a side and the e side and including the $9^{th}$ weld line is folded inward over the lid portion closed end 115 (FIG. 10). Likewise, the end tab 60' corresponding to the welded portions of the c side and the g side and including the $11^{th}$ weld line is folded inward over the lid portion closed end 115. In addition, the end tab 58' corresponding to the welded portions of the b side and the f side and including the $10^{th}$ weld line are folded outward over the b side of the box portion 7 (FIG. 11). Likewise, the end tab 62' corresponding to the welded portions of the d side and the h side and including the 12$^{th}$ weld line are folded outward over the d side of the box portion 7.

The method of forming a pouch cell 2 formed of a metal laminated foil described herein is free of drawing or punching processes or steps, whereby the dimensions of the pouch cell housing 4 formed according to this method are not limited by the draw depth of the metal laminated foil. As a result, pouch cell size and proportions are not limited by the material properties of the pouch material.

Although the first blank 9 and the second blank 109 are described as having a rectangular peripheral shape, the first blank 9 and the second blank 109 are not limited to this shape. For example, the first blank 9 and the second blank 109 may be formed having a circular or irregular peripheral shape.

Although the first blank 9 and the second blank 109 are formed of a three-layer aluminum laminated foil, the material used to form the blanks 9, 109 is not limited to the three-layer aluminum laminated foil. For example, in some embodiments, a greater or fewer number of layers may be used to form the aluminum laminated foil. In other embodiments, the metal layer is formed of a different metal such as, but not limited to, steel.

Although the cell housing 4 is described herein as including a folded box portion 7 assembled with a folded lid portion 8, the cell housing 4 is not limited to this configuration. For example, since the lid portion 8 is not required to have a large depth, is some alternative embodiments, the lid portion 8 may be formed by a drawing process in which the second blank 109 is drawn to form a recess including a closed end, sidewalls and an open end opposed to the closed end. The drawn lid portion 8 may be assembled with the folded box portion 7 as described herein.

Although the pouch cell 2 is described as housing the electrode assembly 5 including electrode plates stacked in the height direction of the cell housing, the pouch cell is not limited to this configuration. For example, the pouch cell 2 may include an electrode assembling having a jelly roll electrode configuration rather than a stacked plate electrode configuration. For another example, rather than providing electrode plates stacked in the height direction of the cell housing 4, the pouch cell 2 may include electrode plates that are stacked in a width or length direction of the cell housing 4.

Selective illustrative embodiments of the battery cell and cell housing are described above in some detail. It should be understood that only structures considered necessary for clarifying these devices have been described herein. Other conventional structures, and those of ancillary and auxiliary components of the battery system, are assumed to be known and understood by those skilled in the art. Moreover, while working examples of the battery cell and battery cell housing been described above, the battery cell and/or battery cell housing is not limited to the working examples described above, but various design alterations may be carried out without departing from the devices as set forth in the claims.

What is claimed is:

1. A method of forming a battery cell having a pouch cell housing, the method including
    providing a first blank of a metal laminated film material,
        the first blank including
        a first blank first surface, and
        a first blank second surface opposed to the first blank first surface,
        a periphery of the first blank having a first edge, a second edge, a third edge and a fourth edge;
    forming first blank to form a first box having an a side that includes the first edge, a b side that includes the second edge, a c side that includes the third edge and a d side that includes the fourth edge, an open end, and closed end opposed to the open end;
    providing a second blank of a metal laminated film material, the second blank including
        a second blank first surface, and
        a second blank second surface opposed to the second blank first surface,
        a periphery of the second blank having a fifth edge, a sixth edge, a seventh edge and an eighth edge;
    forming the second blank to form a second box having an e side that includes the fifth edge, an f side that includes the sixth edge, a g side that includes the seventh edge and an h side that includes the eighth edge, an open end and closed end opposed to the open end,
    the closed end of the second box having the same shape and dimensions as the closed end of the first box,
    inserting the second box into the open end of the first box such that
        the closed end of the second box is surrounded by the a side, the b side, the c side and the d side of the first box, and is spaced apart from the open end of the first box,
        the open end of the second box opens in the same direction as the open end of the first box; and
        the e side, the f side, the g side and the h side of the second box are at least partially surrounded by the a side, the b side, the c side and the d side of the first box; and
    welding the a side, the b side, the c side and the d side of the first box to a corresponding one of the e side, the f side, the g side and the h side of the second box to form a sealed container.

2. The method of claim 1, wherein the first blank and the second blank are formed into a box shape using a drawing-free process.

3. The method of claim 1, wherein the first blank is formed into a box shape using a drawing-free process, and the second blank is formed into a box shape using a drawing process.

4. The method of claim 1, wherein the welding step comprises
    welding the a side to the e side along the entire length of at least one of the a side and the e side;
    welding the b side to the f side along the entire length of at least one of the b side and the f side;
    welding the c side to the g side along the entire length of at least one of the c side and the g side; and
    welding the d side to the h side along the entire length of at least one of the d side and the h side.

5. The method of claim 1, including the following method step:
    folding welded portions of the a side and the e side over the closed end of the second box;
    folding welded portions of the c side and the g side over the closed end of the second box;
    folding welded portions of the b side and the f side over the b side; and
    folding welded portions of the d side and the h side over the d side,
    such that the closed end of the second box closes the first box.

6. A method of forming a battery cell having a pouch cell housing, the method including providing a first blank of a metal laminated film material, the first blank including
a first blank first surface,
a first blank second surface opposed to the first blank first surface;
folding the first blank to form a first box having an a side, a b side, a c side and a d side, an open end and closed end opposed to the open end;
providing a second blank of a metal laminated film material, the second blank including
a second blank first surface,
a second blank second surface opposed to the second blank first surface;
folding the second blank to form a second box having an e side, an f side, a g side and an h side, an open end and closed end opposed to the open end, the closed end of the second box having the same shape and dimensions as the closed end of the first box,
inserting the second box into the open end of the first box such that
the closed end of the second box is surrounded by the a side, the b side, the c side and the d side of the first box, and is spaced apart from the open end of the first box,
the open end of the second box opens in the same direction as the open end of the first box; and
the e side, the f side, the g side and the h side of the second box are at least partially surrounded by the a side, the b side, the c side and the d side of the first box;
welding the a side to the e side;
welding the b side to the f side;
welding the c side to the g side;
welding the d side to the h side;
folding welded portions of the a side and the e side over the closed end of the second box;
folding welded portions of the c side and the g side over the closed end of the second box;
folding welded portions of the g side and the f side over the b side; and
folding welded portions of the d side and the h side over the d side, such that the closed end of the second box closes the first box.

7. The method of claim 1, wherein the first blank is formed into the first box by performing folding operations on the first blank, and the second blank is formed into the second box by performing folding operations on the second blank.

8. The method of claim 1, wherein the steps of forming first blank to form a first box and forming the second blank to form a second box, are performed prior to the insertion step.

* * * * *

UNITED STATES PATENT AND TRADEMARK OFFICE
CERTIFICATE OF CORRECTION

PATENT NO. : 10,777,784 B2
APPLICATION NO. : 15/768010
DATED : September 15, 2020
INVENTOR(S) : Schneider et al.

Page 1 of 1

It is certified that error appears in the above-identified patent and that said Letters Patent is hereby corrected as shown below:

In the Claims

In Claim 8, at Column 10, Line 24 "a second box, are performed" should read --a second box are performed--.

Signed and Sealed this
Nineteenth Day of January, 2021

Andrei Iancu
*Director of the United States Patent and Trademark Office*